(12) United States Patent
Liang et al.

(10) Patent No.: US 12,244,952 B2
(45) Date of Patent: Mar. 4, 2025

(54) SINGLE-SHOT COMPRESSED OPTICAL-STREAKING ULTRA-HIGH-SPEED PHOTOGRAPHY METHOD AND SYSTEM

(71) Applicant: INSTITUT NATIONAL DE LA RECHERCHE SCIENTIFIQUE, Québec (CA)

(72) Inventors: Jinyang Liang, Boucherville (CA); Xianglei Liu, Longueuil (CA); Fiorenzo Vetrone, Montréal (CA)

(73) Assignee: INSTITUT NATIONAL DE LA RECHERCHE SCIENTIFIQUE, Québec (CA)

( * ) Notice: Subject to any disclaimer, the term of this patent is extended or adjusted under 35 U.S.C. 154(b) by 887 days.

(21) Appl. No.: 17/310,037

(22) PCT Filed: Jan. 29, 2020

(86) PCT No.: PCT/CA2020/050107
§ 371 (c)(1),
(2) Date: Jul. 13, 2021

(87) PCT Pub. No.: WO2020/154806
PCT Pub. Date: Aug. 6, 2020

(65) Prior Publication Data
US 2022/0103774 A1    Mar. 31, 2022

Related U.S. Application Data

(60) Provisional application No. 62/798,716, filed on Jan. 30, 2019.

(51) Int. Cl.
*H04N 25/77* (2023.01)
*G01J 11/00* (2006.01)
(Continued)

(52) U.S. Cl.
CPC .............. *H04N 25/77* (2023.01); *G01J 11/00* (2013.01); *G01N 21/6408* (2013.01); *G01J 2011/005* (2013.01); *H04N 23/60* (2023.01)

(58) Field of Classification Search
CPC .... H04N 25/77; H04N 23/60; H04N 13/0282; G01J 11/00; G01J 2011/005; G01N 21/6408
(Continued)

(56) References Cited

U.S. PATENT DOCUMENTS

| 2014/0267781 | A1  | 9/2014 | Buckner et al. |
| 2017/0163971 | A1  | 6/2017 | Wang et al. |
| 2018/0224552 | A1* | 8/2018 | Wang ................... H04N 19/593 |

FOREIGN PATENT DOCUMENTS

| CN | 102540446 A | 7/2012 |
| CN | 107205103 A | 9/2017 |

OTHER PUBLICATIONS

P W W Fuller (2009) An introduction to high speed photography and photonics, The Imaging Science Journal, 57:6, 293-302, DOI: 10.1179/136821909X12490326247524.
(Continued)

*Primary Examiner* — Joel W Fosselman
(74) *Attorney, Agent, or Firm* — Lavery, de Billy, L.L.P.; Gwendoline Bruneau

(57) ABSTRACT

A system and a method for single-shot compressed optical-streaking ultra-high-speed imaging, the system comprising a spatial encoding module spatially encoding the transient event with a binary pseudo-random pattern into spatially encoded frames; a galvanometer scanner temporally shearing the spatially encoded frames; and a CMOS camera receiving the temporally sheared spatially encoded frames, during one exposure time of the camera, for reconstructing the transient event. The method comprises spatial encoding
(Continued)

a transient event; temporal shearing resulting spatially encoded frames of the event, spatio-temporal integration, and reconstruction.

20 Claims, 9 Drawing Sheets

(51) Int. Cl.
  *G01N 21/64* (2006.01)
  *H04N 23/60* (2023.01)
(58) Field of Classification Search
  USPC ........................................................ 348/215.1
  See application file for complete search history.

(56) References Cited

OTHER PUBLICATIONS

S. S. Howard, A. Straub, N. G. Horton, D. Kobat, and C. Xu, Frequency-multiplexed in vivo multiphoton phosphorescence lifetime microscopy, Nat Photonics 7, 33-37 (2013).
W. Yang and R. Yuste, In vivo imaging of neural activity, Nat Methods 14, 349-359 (2017).
M. D. Dong, S. Husale, and O. Sahin, Determination of protein structural flexibility by microsecond force spectroscopy, Nat Nanotechnol 4, 514-517 (2009).
A. Ehn, J. Bood, Z. M. Li, E. Berrocal, M. Alden, and E. Kristensson, FRAME: femtosecond videography for atomic and molecular dynamics, Light-Sci Appl 6, e17045 (2017).
K. Goda, K. K. Tsia, and B. Jalali, Serial time-encoded amplified imaging for real-time observation of fast dynamic phenomena, Nature 458, 1145-1149 (2009).
K. Goda, A. Ayazi, D. R. Gossett, J. Sadasivam, C. K. Lonappan, E. Sollier, A. M. Fard, S. C. Hur, J. Adam, C. Murray, C. Wang, N. Brackbill, D. Di Carlo, and B. Jalali, High-throughput single-microparticle imaging flow analyzer, Proc. Natl. Acad. Sci. U.S.A 109, 11630-11635 (2012).
K. Goda and B. Jalali, Dispersive Fourier transformation for fast continuous single-shot measurements, Nat Photonics 7, 102-112 (2013).
J. L. Wu, Y. Q. Xu, J. J. Xu, X. M. Wei, A. C. S. Chan, A. H. L. Tang, A. K. S. Lau, B. M. F. Chung, H. C. Shum, E. Y. Lam, K. K. Y. Wong, and K. K. Tsia, Ultrafast laser-scanning time-stretch imaging at visible wavelengths, Light-Sci Appl 6, e16196 (2017).
C. T. Chin, C. Lancee, J. Borsboom, F. Mastik, M. E. Frijlink, N. de Jong, M. Versluis, and D. Lohse, Brandaris 128: A digital 25 million frames per second camera with 128 highly sensitive frames, Rev Sci Instrum 74, 5026-5034 (2003).
V. Tiwari, M. A. Sutton, and S. R. McNeill, Assessment of High Speed Imaging Systems for 2D and 3D Deformation Measurements: Methodology Development and Validation, Exp Mech 47, 561-579 (2007).
T. G. Etoh, D. V. Son, T. Yamada, and E. Charbon, Toward One Giga Frames per Second—Evolution of in Situ Storage Image Sensors, Sensors 13, 4640-4658 (2013).
M. Suzuki, M. Suzuki, R. Kuroda, and S. Sugawa, A Preliminary Chip Evaluation toward Over 50Mfps Burst Global Shutter Stacked CMOS Image Sensor, Electronic Imaging 2018, 3981-3984 (2018).
J. Hunt, T. Driscoll, A. Mrozack, G. Lipworth, M. Reynolds, D. Brady, and D. R. Smith, Metamaterial Apertures for Computational Imaging, Science 339, 310-313 (2013).
D. L. Donoho, Compressed Sensing, IEEE Trans. Inf. Theory 52, 1289-1306 (2006).
J. Y. Liang and L. H. W. Wang, Single-shot ultrafast optical imaging, Optica 5, 1113-1127 (2018).
R. G. Baraniuk, T. Goldstein, A. C. Sankaranarayanan, C. Studer, A. Veeraraghavan, and M. B. Wakin, Compressive Video Sensing, IEEE Signal Proc Mag 34, 52-66 (2017).
D. Reddy, A. Veeraraghavan, and R. Chellappa, P2C2: Programmable Pixel Compressive Camera for High Speed maging, CVPR 329-336 (2011).
Y. Hitomi, J. W. Gu, M. Gupta, T. Mitsunaga, and S. K. Nayar, Video from a Single Coded Exposure Photograph using a Learned Over-Complete Dictionary, IEEE Int Conf Comp Vis, 287-294 (2011).
P. Llull, X. J. Liao, X. Yuan, J. B. Yang, D. Kittle, L. Carin, G. Sapiro, and D. J. Brady, Coded aperture compressive temporal imaging, Opt Express 21, 10526-10545 (2013).
R. Koller, L. Schmid, N. Matsuda, T. Niederberger, L. Spinoulas, O. Cossairt, G. Schuster, and A. K. Katsaggelos, High spatio-temporal resolution video with compressed sensing, Opt Express 23, 15992-16007 (2015).
F. Mochizuki, K. Kagawa, S. Okihara, M. W. Seo, B. Zhang, T. Takasawa, K. Yasutomi, and S. Kawahito, Single-event transient imaging with an ultra-high-speed temporally compressive multi-aperture CMOS image sensor, Opt Express 24, 4155-4176 (2016).
L. Gao, J. Y. Liang, C. Y. Li, and L. H. V. Wang, Single-shot compressed ultrafast photography at one hundred billion frames per second, Nature 516, 74-77 (2014).
J. Y. Liang, C. Ma, L. R. Zhu, Y. J. Chen, L. Gao, and L. H. V. Wang, Single-shot real-time video recording of a photonic Mach cone induced by a scattered light pulse, Sci Adv 3, e1601814 (2017).
J. Y. Liang, L. R. Zhu, and L. H. V. Wang, Single-shot real-time femtosecond imaging of temporal focusing Light-Sci Appl 7, 42 (2018).
D. Wu, X. Zhou, B. L. Yao, R. Z. Li, Y. L. Yang, T. Peng, M. Lei, D. Dan, and T. Ye, Fast frame scanning camera system for light-sheet microscopy, Appl Optics 54, 8632-8636 (2015).
B. D. Buckner and D. L'Esperance, Digital synchroballistic schlieren camera for high-speed photography of bullets and rocket sleds, Opt Eng 52, 083105 (2013).
J. M. Bioucas-Dias and M. A. T. Figueiredo, A New TwIST: Two-Step Iterative Shrinkage/Thresholding Algorithms for Image Restoration, IEEE T Image Process 16, 2992-3004 (2007).
T. W. Chen, T. J. Wardill, Y. Sun, S. R. Pulver, S. L. Renninger, A. Baohan, E. R. Schreiter, R. A. Kerr, M. B. Orger, V. Jayaraman, L. L. Looger, K. Svoboda, and D. S. Kim, Ultrasensitive fluorescent proteins for imaging neuronal activity, Nature 499, 295-300 (2013).
H. Mikami, L. Gao, and K. Goda, Ultrafast optical imaging technology: principles and applications of emerging methods, Nanophotonics 5, 497-509 (2016).
D. Jaque and F. Vetrone, Luminescence nanothermometry, Nanoscale 4, 4301-4326 (2012).
Bouchard et al., Swept confocally-aligned planar excitation (SCAPE) microscopy for high-speed volumetric imaging of behaving organisms, Nature Photonics | vol. 9 | Feb. 2015 | www.nature.com/naturephotonics, Published Online: Jan. 19, 2015 | DOI: 10.1038/NPHOTON.2014.323.
International Searching Authority, Written Opinion, PCT/CA2020/050107, Apr. 6, 2020.
International Searching Authority, International Search Report, PCT/CA2020/050107, Apr. 2, 2020.

\* cited by examiner

SINGLE-SHOT COMPRESSED OPTICAL-STREAKING ULTRA-HIGH-SPEED PHOTOGRAPHY METHOD AND SYSTEM

CROSS-REFERENCE TO RELATED APPLICATIONS

This application is a National Entry Application of PCT application no. PCT/CA2020/050107 filed on Jan. 29, 2020 and published in English under PCT Article 21(2), which itself claims benefit of U.S. provisional application Ser. No. 62/798,716, filed on Jan. 30, 2019. All documents above are incorporated herein in their entirety by reference.

FIELD OF THE INVENTION

The present invention relates to imaging methods. More specifically, the present invention is concerned with a single-shot compressed optical-streaking ultra-high-speed imaging method and system.

BACKGROUND OF THE INVENTION

Single-shot ultra-high-speed imaging methods can be generally categorized into active-detection and passive-detection methods. The active-detection methods use specially designed pulse trains to probe 2D transient events, such as (x,y) frames that vary in time, and include frequency-dividing imaging and time-stretching imaging. Such methods are not suitable for imaging self-luminescent and color-selective events. By contrast, the passive-detection methods use receive-only ultra-high-speed detectors, such as rotatory-mirror-based cameras, beam-splitting-based framing cameras, in-situ storage image sensor CCD (charge-coupled device) cameras, and global shutter stacked CMOS (complementary metal oxide semiconductor) cameras for example, to record photons scattered and emitted from transient scenes. Such cameras either have a bulky and complicated structure or have a limited sequence depth, defined as the number of frames in one acquisition, and pixel count, defined as the number of pixels per frame.

To circumvent these drawbacks, computational imaging methods, combining physical data acquisition and numerical image reconstruction, were increasingly featured in recent years. In particular, the implementation of compressed sensing (CS) for spatial and/or temporal multiplexing has allowed overcoming the speed limit with a substantial improvement in the sequence depth and pixel count. Representative methods in computational imaging methods include programmable pixel compressive camera (P2C2), coded aperture compressive temporal imaging (CACTI), and multiple-aperture (MA)-CS CMOS camera. However, despite reaching over one megapixel per frame, the imaging speeds of P2C2 and CACTI, inherently limited by the refreshing rate of spatial light modulation and the moving speed of a piezoelectric stage, are limited at several thousand frames per second (fps), typically to kfps. MA-CS CMOS, despite ultra-high-speed imaging speeds, has a pixel count limited to 64×108 with a sequence depth of 32. Thus, existing computational imaging methods still fail to simultaneously combine high frame rates, sequence depth, and pixel count for ultra-high-speed imaging.

There is still a need in the art for a ultra-high-speed imaging method and system.

SUMMARY OF THE INVENTION

More specifically, in accordance with the present invention, there is provided a system for single-shot compressed optical-streaking ultra-high-speed imaging, comprising a spatial encoding module; a galvanometer scanner; and a CMOS camera, wherein the spatial encoding module is configured for spatially encoding the transient event with a binary pseudo-random pattern, yielding spatially encoded frames, the galvanometer scanner temporally shearing the spatially encoded frames of the transient event, and the CMOS camera receiving the temporally sheared spatially encoded frames, in one exposure of the camera, for reconstructing the transient event.

There is further provided a method for single-shot compressed optical-streaking ultra-high-speed imaging, comprising spatial encoding a transient event; temporal shearing resulting spatially encoded frames of the event, spatio-temporal integration, and reconstruction.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

In a nutshell, a method according to an aspect of the present disclosure combines compressed sensing with optical streak imaging. The method comprises spatially encoding each temporal frame of a scene by compressed sensing using a spatial encoding module, thereby labeling the capture time of each frame. Then the method comprises temporal shearing in the temporal domain, using a temporal encoding module, thereby creating an optical streak image, capturing this streak image with an array detector in a single shot, and obtaining the temporal properties of light from this streak image. The mixture of 2D space and time data in the streak image can be processed to separate the data using reconstruction on the basis of the unique labels attached to each temporal frame.

Figure 1A:
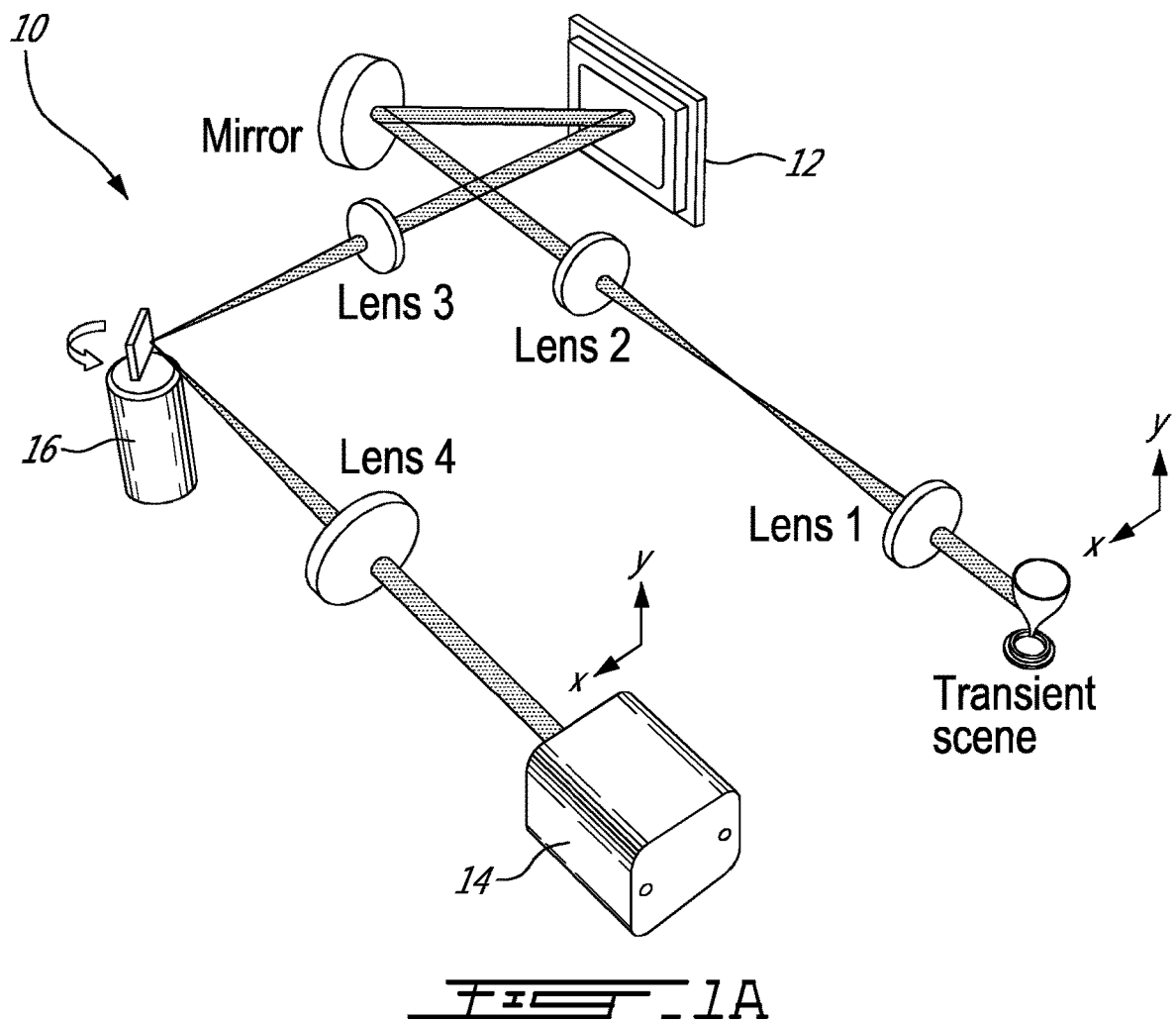
FIG. 1A is a schematic of a system according to an embodiment of an aspect of the present disclosure.

A system 10 according to an embodiment of aspect of the present disclosure is illustrated in FIG. 1A.

The system 10 comprises a spatial encoding module 12. The spatial encoding module 12 is a spatial light modulator such as digital micromirror device (DMD), AJD-4500, Ajile Light Industries for example, on which a binary pseudo-random pattern is loaded with an encoding pixel size of 32.4×32.4 µm². Alternatively, the spatial encoding module 12 may be a printed physical mask with an encoding pattern for example. The spatial encoding module 12 has a fixed ±12° flipping angle and about 1 Mega pixel count.

A transient scene is first imaged into the spatial encoding module 12, where it is spatially encoded by the binary pseudo-random pattern. Resulting spatially encoded frames (c) are then relayed by a $4_f$ system onto a CMOS camera 14 for detection. The CMOS camera 14 may be a cell phone, a CCD or a CMOS GS3-U3-23S6M-C, FLIR for example, with a frame rate per second in a range between 1 and 160, for example between 15 and 25, and a Mega pixel count.

A galvanometer scanner 16, placed at the Fourier plane of the $4_f$ system, temporally shears ($s_o$) the spatially encoded frames linearly to different spatial locations along the x axis of the camera 14 according to their time of arrival. The galvanometer scanner 16 may be a GS, 6220H, Cambridge Technology, for example. The galvanometer scanner 16 is selected with a rotation frequency per second in a range between 1 and 160, for example between 15 and 25, and a small angle step response, typically 200 µs.

The image is optically relayed from the transient scene to the CMOS camera 14, by an optical relay module. Four achromatic lens and a mirror are shown; Lenses 1 and 4 are 75-mm focal length achromatic lenses with 1 inch diameter and Lenses 2 and 3 are 100-mm focal length achromatic lenses with 2 inch diameter, such as Thorlabs AC508-100, AC508-075, and the Mirror may be Thorlabs PF10-03-P01 for example. Alternatively, a camera lens with selected focal length and diameter may be used.

Figure 1B:
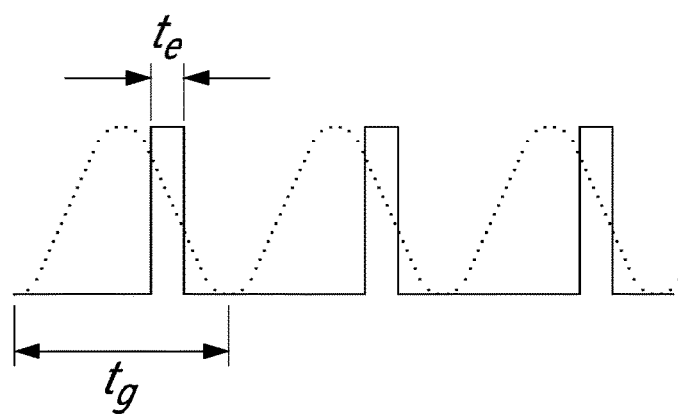
FIG. 1B shows synchronization between the exposure of the CMOS camera (solid line) with an exposure time of $t_e$ and the sinusoidal control signal of the galvonometer scanner (dashed line) with a period of $t_g$ in the system of FIG. 1A.

As a result of the spatial encoding of the frames by the binary pseudo-random pattern loaded on the DMD 12, the N frames taken in a single exposure during the exposure time t of the camera 14 as allowed by rotation of the scanner 16 are ordered. The synchronization between the rotation of the galvanometer scanner 16 and the exposure of the camera 14 is controlled by a sinusoidal signal ($t_g$) and a rectangular signal ($t_e$) generated by a function generator (not shown) as shown in FIG. 1B. The function generator may be DG1022z, RIGOL TECHNOLOGIES, INC for example.

Finally, via spatiotemporal integration (T), the camera 14 compressively records the spatially encoded and temporally sheared scene as a 2D streak image E with a single exposure.

The operation of the system can be described by the following relation:

$$E = TS_o CI(x,y,t), \qquad (1)$$

where $I(x,y,t)$ is the light intensity of the transient event, c represents spatial encoding by the DMD 12, $s_o$ represents linearly temporal shearing by the scanner 16 with the subscript "o" standing for "optical", and T represents spatiotemporal integration by the camera 14.

With prior knowledge or assumptions about the signal, including for example parameters of the encoding pattern, measured streak image, and physical forward operators such as spatial encoding, temporal shearing, and integration, and with the spatiotemporal sparsity of the scene, the light intensity of the transient event $I(x,y,t)$ can be recovered from the measurement of the 2D streak image E by solving the inverse problem using compressed sensing reconstruction as follows:

$$\hat{I} = \operatorname*{argmin}_{I} \{\|E - TS_o CI\|_2^2 + \lambda \phi_{TV}(I)\} \qquad (2)$$

where $\|\bullet\|_2^2$ represents the $l_2$ norm, $\lambda$ is a weighting coefficient, and $\Phi_{TV}$ is total variation (TV) regularizer. In experiments described hereinbelow, $I(x,y,t)$ was recovered by using a compressed sensing-based algorithm developed upon a two-step iterative shrinkage/thresholding algorithm.

To obtain a linearly temporal shearing by the scanner 16, the linear rotation of the galvanometer scanner 16 and the exposure of the camera 14 need be synchronized: a static target is placed at the object plane, in the plane of the transient scene in FIG. 1A; and illuminated by a pulse laser to generate a transient scene. By tuning the initial phase of the sinusoidal function ($t_g$), the exposure window of the camera 14 is adjusted in search of a peak or valley of the sinusoidal signal ($t_g$), i.e. until local features of the static target are precisely matched in the streak image due to the symmetric back and forth scanning. Finally, 90° is added to the initial phase of the sinusoidal function ($t_g$) to locate the linear slope region of the sinusoidal function ($t_g$). The reconstructed movie has a frame rate of:

$$r = \frac{aUf_4}{t_g d}, \quad (3)$$

α=0.07 rad/V is a constant that links the voltage added onto the galvanometer scanner 16, denoted as U, with the deflection angle in its linear rotation range. $f_4$=75 mm is the focal length of Lens 4, $t_R$ is the period of the sinusoidal voltage waveform added to the galvanometer scanner 16, and d=5.86 μm is the pixel size of the CMOS camera 14 used in experiments. In addition, the pre-set exposure time $t_e$ of the CMOS camera 14 determines the total length of the recording time window. If the entire streak is located within the CMOS camera 14, the sequence depth can be calculated by $N_t=rt_e$. The number of pixels in the X axis of each frame, $N_x$, can be calculated by $N_x \leq N_c+1-N_t$, where $N_c$ is the number of pixels in each column of the CMOS camera 14. The number of pixels $N_y$ in the y axis of each frame is at most equal to the number of pixels $N_r$ in each row of the CMOS camera 14: $N_y < N_r$.

Figure 2A:
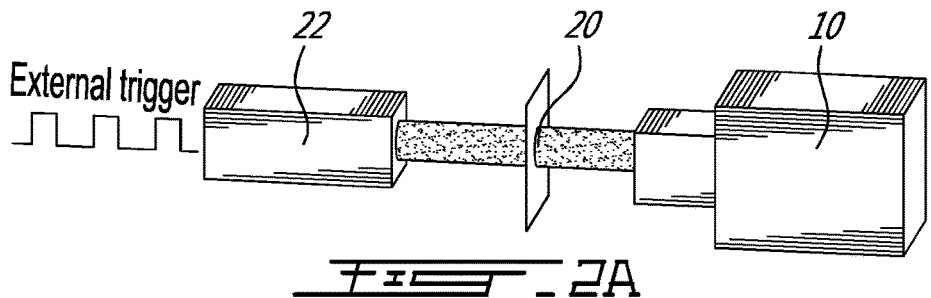
FIG. 2A is a schematic of a set up for quantifying spatial frequency responses of the system of FIG. 1A.
Figure 2B:
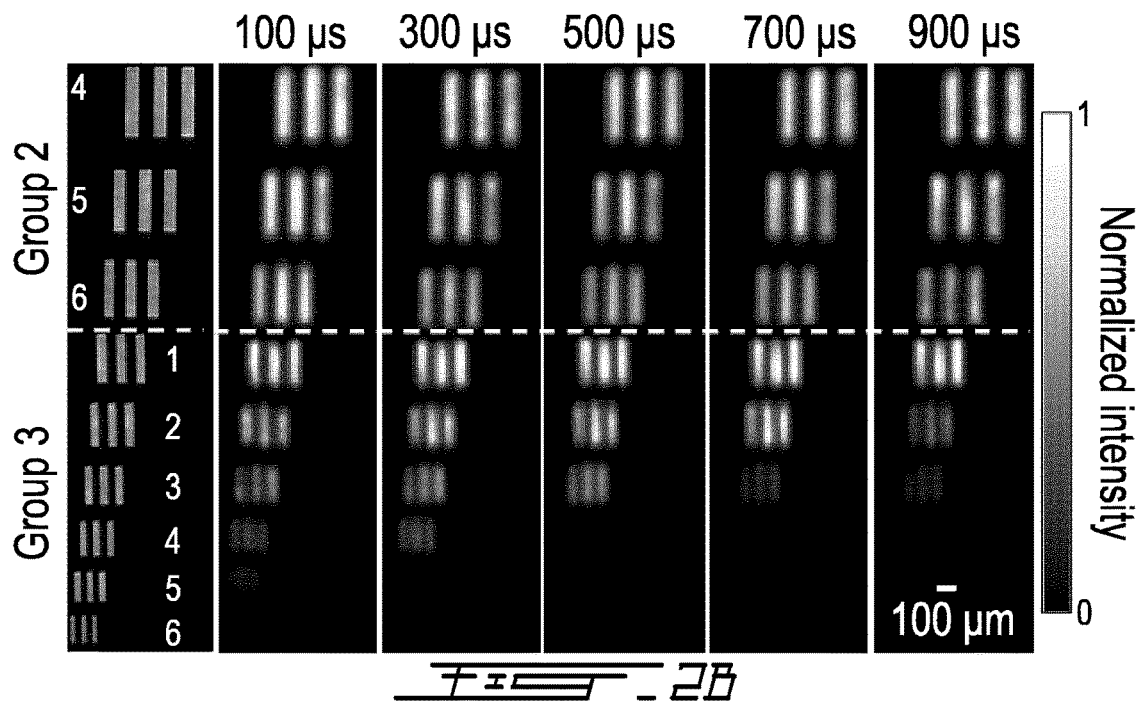
FIG. 2B shows illuminated bars on the resolution target; in the first panel, the numbers represent Elements 4 to 6 in Group 2 and Elements 1 to 6 in Group 3; the rest of the panels show the projected images of illuminated bars for different laser pulse widths, calculated by summing the reconstructed (x,y,t) datacubes along the t axis over voxels.

To characterize the spatial frequency responses of the system 10, single laser pulses illuminating through a resolution target 20 were imaged (FIG. 2A). A 532-nm continuous wave laser 22 controlled by an external trigger generated laser pulses with different temporal widths. Five different pulse widths, of 100, 300, 500, 700, and 900 μs, were used to provide decreased sparsity from 90% to 10% with a step of 20% in the temporal axis for a recording time window of 1 ms. The system 10 was used to capture these dynamic scenes at 60 kfps. The first panel in FIG. 2B shows illuminated bars corresponding to elements 4 to 6 in Group 2 and elements 1 to 6 in Group 3). Movies were reconstructed for each pulse width and datacubes representing the movies in a format of (x, y, t) were projected onto the x-y plane, as shown in the remaining panels in FIG. 2B.

Figure 2C:
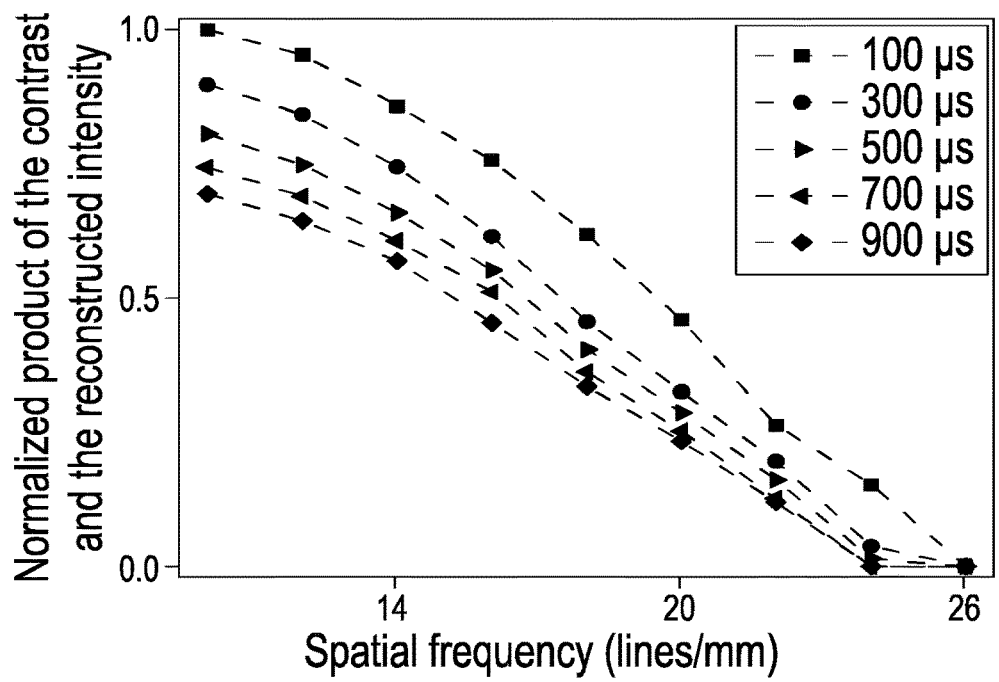
FIG. 2C shows a comparison of spatial frequency responses of the system with different laser pulse widths.

These results show that the spatial resolution of the system 10 depends on the sparsity of the transient scene. The contrast as well as the intensity the reconstructed image quality degrades with increasing laser pulse widths. To quantify the performance of the system by considering both effects, the normalized product of the contrast and the reconstructed intensity was used as the merit function (FIG. 2C). For the 900-μs pulse illumination, Element 3 in Group 3 in the reconstruction has a normalized product below 0.25, which was used as the threshold to determine the resolvable feature, and the spatial resolution of the system was quantified to be 50 μm.

Thus, a method according to the present disclosure comprise multiplying a amplitude binary mask for each frame of the event, yielding encoded datacubes (x,y,t); shifting the different frames to different spatial positions as a function of their arrival time, yielding spatial-temporal shifting datacubes (x, y+t−1, t); integrating the datacubes as a 2D image (x, y+t−1); and retrieving a video from a measurement E of the 2D image, with:

$$E = TS_oCI(x,y,t), \quad (1)$$

where I(x,y,t) is the light intensity of the transient event, C represents spatial encoding, $S_o$ represents linearly temporal shearing with the subscript "o" standing for "optical", and T represents spatiotemporal integration; and $$\hat{I} = \underset{I}{\operatorname{argmin}}\{\|E - TS_oCI\|_2^2 + \lambda\phi_{TV}(I)\} \quad (2)$$

where $\|\cdot\|_2^2$ represents the $l_2$ norm, λ is a weighting coefficient, and $\Phi_{TV}$ is total variation (TV) regularize.

Figure 3A:
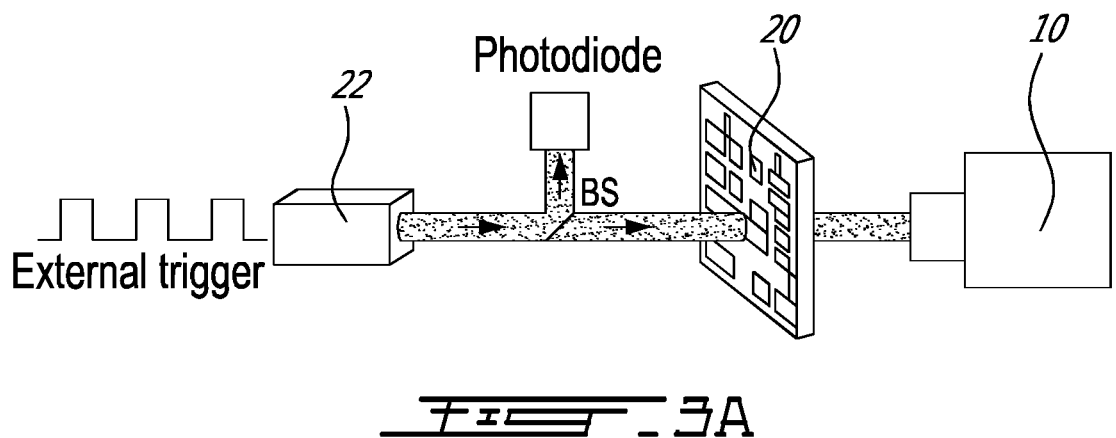
FIG. 3A is a schematic of a set up for assessing multi-scale ultra-high-speed imaging capability of the system of FIG. 1A.

To demonstrate the multi-scale ultra-high-speed imaging capability of the system, transmission of single laser pulses was captured through a mask. A beam splitter BS was used to divide the incident laser pulse into two components: the reflected component was recorded by a photodiode, generating time reference information (ground truth), and the transmitted component illuminated a transmissive mask with the letters USAF that modulated the spatial profiles of the laser pulses (FIG. 3A), and was then recorded by the system 10.

Figure 3B:
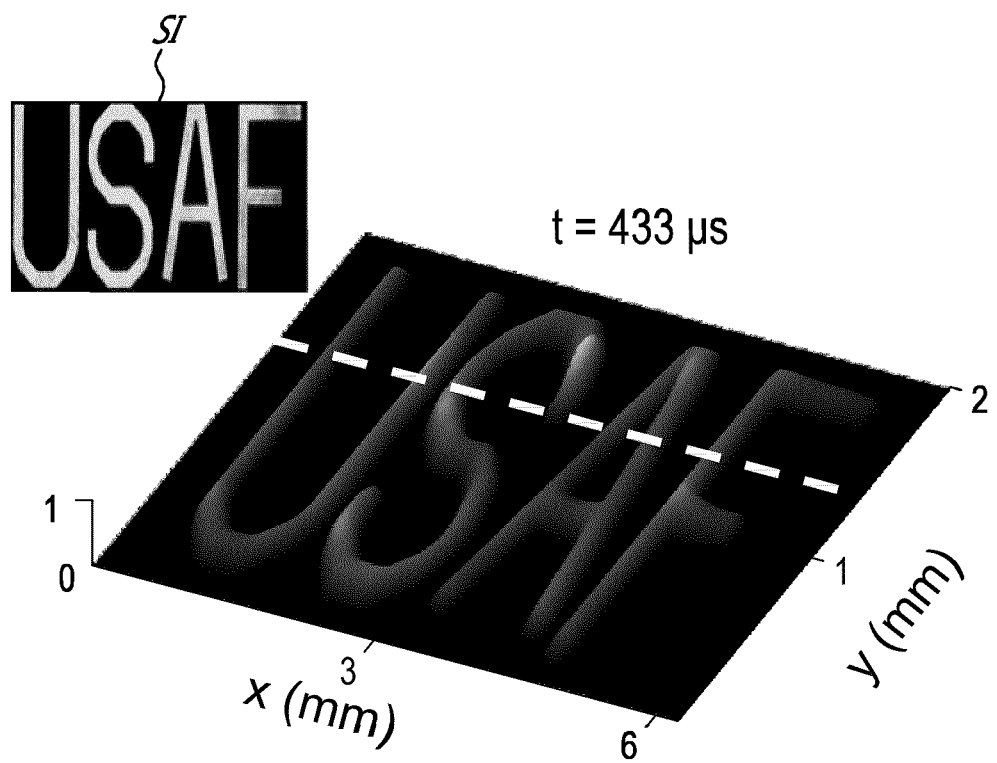
FIG. 3B shows a represented reconstructed frame showing a 300-µs laser pulse passing through a transmissive USAF pattern, at imaging speed of 60 kfps; inset showing the time-integrated image captured by the CMOS camera with its intrinsic imaging speed (20 fps)

In a first experiment, a pulse train that contained four 300-μs pulses was generated. The imaging speed of the system 10 was set to 60 kfps. While the CMOS camera 14, at its intrinsic imaging speed of 20 fps, provided a single image (see SI in FIG. 38) without temporal information, the system 10 recorded the spatial profile of the mask and the intensity time course of the laser pulse in a movie with 240 frames/s. A representative frame (t=433 μs) is shown in FIG. 3B.

Figure 3C:
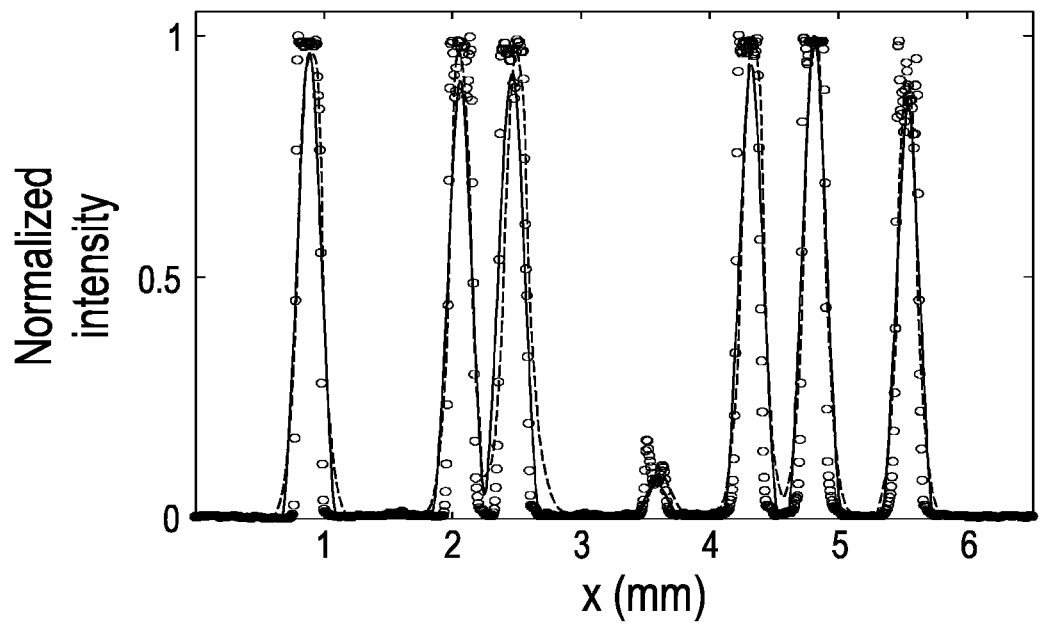
FIG. 3C shows the normalized intensity of a selected cross section (dash lines in FIG. 3B and FIG. 3E) in the ground truth (circle) and in the representative reconstructed frames using 300-µs (solid line) and 10-µs (dashed line) laser pulses.
Figure 3D:
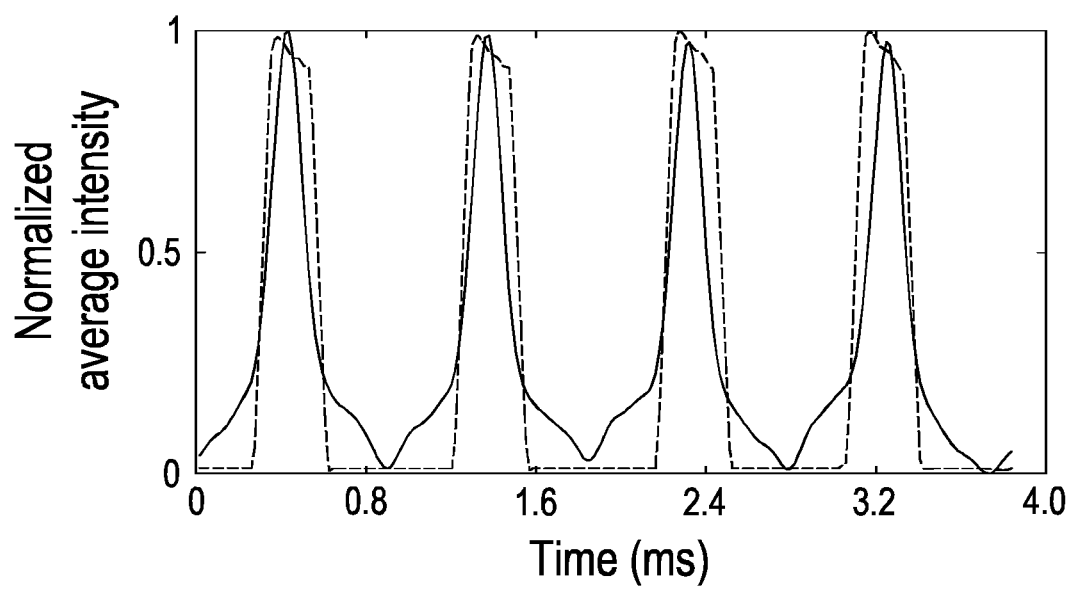
FIG. 3D shows a comparison of the measured normalized average intensity of the laser pulse as a function of time using the system of FIG. 1A (solid line) and a photodiode (dashed line) for the 300-µs laser pulse.
Figure 3E:
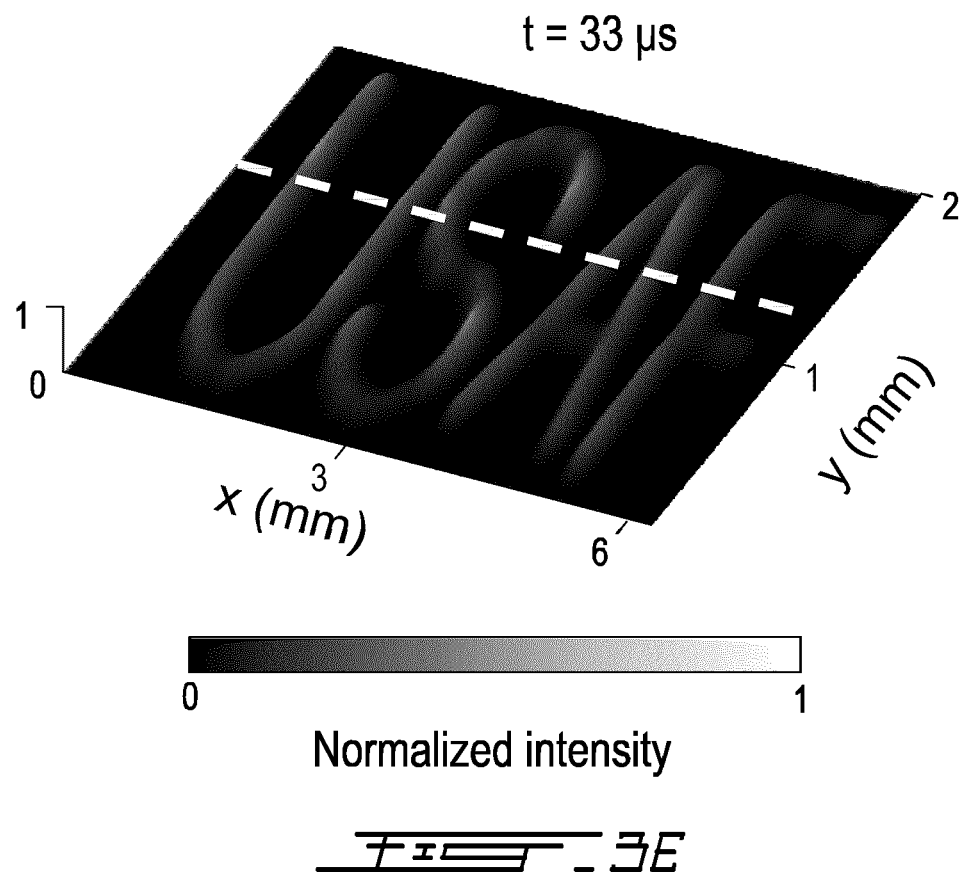
FIG. 3E shows a represented reconstructed frame showing a 10-µs laser pulse passing through a transmissive USAF pattern, at imaging speed of 1.5-Mfp.
Figure 3F:
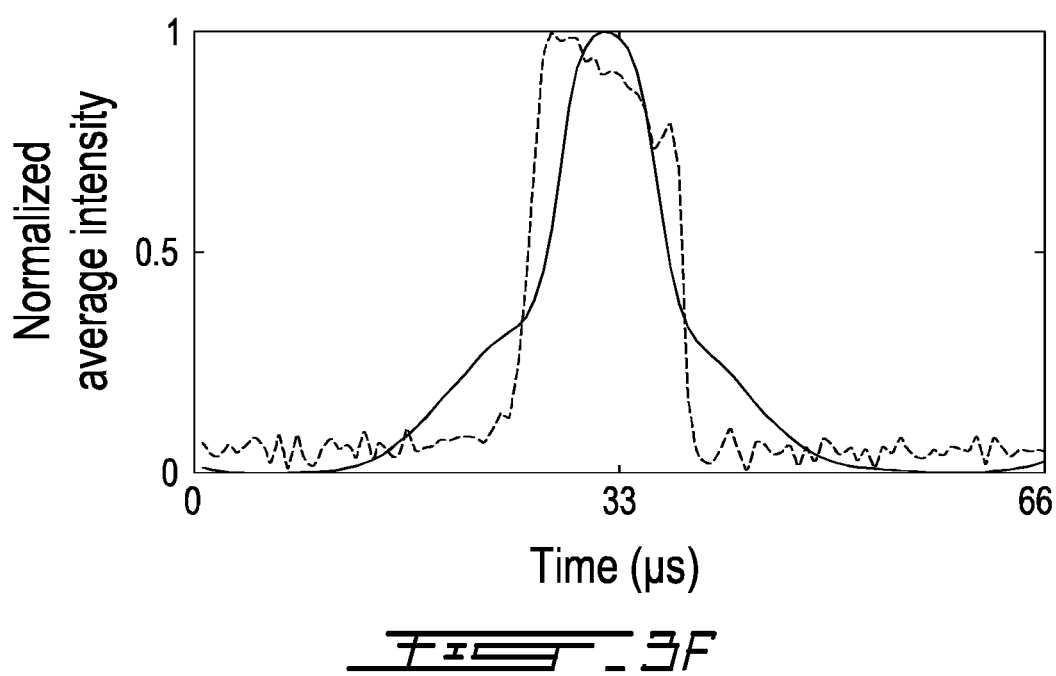
FIG. 3F shows a comparison of the measured normalized average intensity of the laser pulse as a function of time using the system of FIG. 1A (solid line) and a photodiode (dashed line) for the 10-µs laser pulse.
Figure 4A:
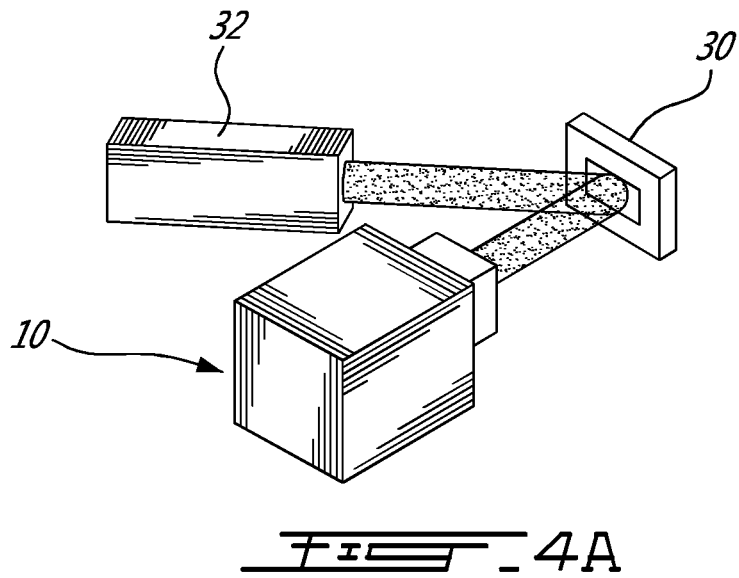
FIG. 4A shows an experimental setup for tracing a fast-moving object using the system of FIG. 1A.

FIG. 3C shows the normalized intensity of a selected cross section (dashed line in FIG. 3B and FIG. 3E), which demonstrates the well reconstructed spatial features with respect to the ground truth. The average intensity was also calculated in each frame. The time course shows a good agreement with the photodiode-recorded result (FIG. 3D). Then the imaging speed was increased to 1.5 Mfps to record a single 10-μs laser pulse. The reconstructed movie is Movie 3, and a representative frame (t=33 μs) is shown in FIG. 3E. The comparison of the time courses of averaged intensity (FIG. 3F) confirmed consistency between system and photodiode results under this imaging speed To demonstrate the ability of the system to track fast moving objects, an animation of a fast-moving ball was imaged (FIG. 4A). The animation comprised 40 patterns, which were loaded and played by a DMD 30 (such as D4100, Digital Light Innovations) at 20 kHz. A collimated laser beam 32 was imaged onto the digital micromirror device 30 at an angle of about 240 relative to the surface normal of the DMD 30. The system 10, positioned facing perpendicularly the surface of the DMD 30, collected the light diffracted by the patterns at 140 kfps.

Figure 4B:
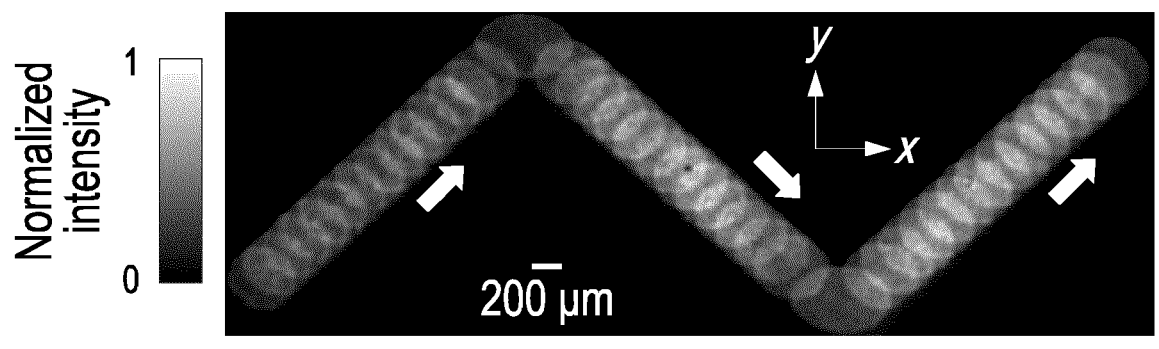
FIG. 4B shows the time-integrated image of the fast-moving ball patterns, imaged at the intrinsic frame rate of the CMOS camera (20 fps)

FIG. 4B shows a time-integrated image of the dynamic event acquired by the CMOS camera 14 of the system 10 at its intrinsic frame rate of 20 fps.

Figure 4C:
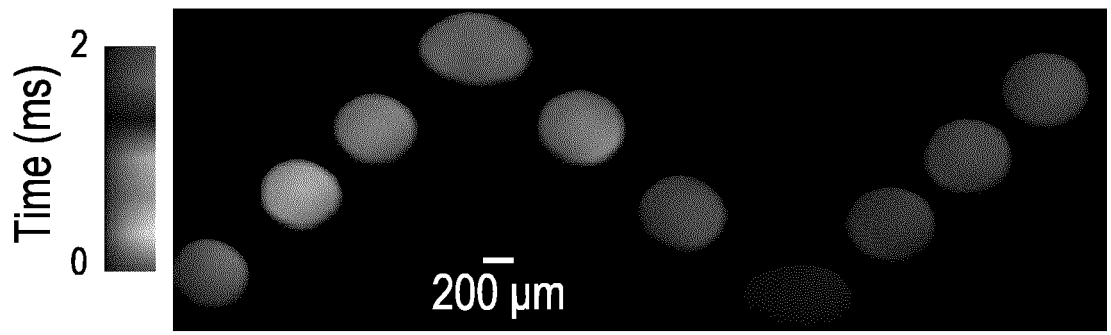
FIG. 4C shows the superimposed image of 10 representative time-lapse frames, with an interval of 215 µs, of the same dynamic scene as in FIG. 4B, imaged by using the system of FIG. 1A.
Figure 4D:
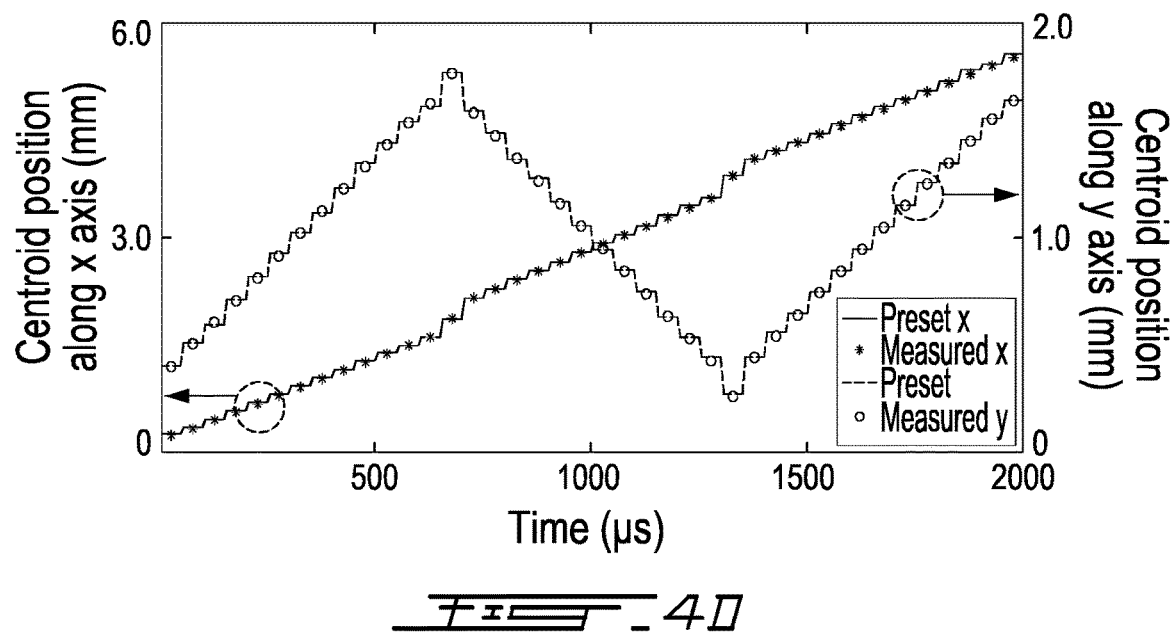
FIG. 4D shows a comparison of the centroid positions along the x and y axes between the measurement results and the ground truths; only one data point being shown for every seven measured data points.

FIG. 4C shows a color-encoded image generated by superimposing ten representative time-lapse frames, with an interval of 215 μs, of the moving ball from the movies reconstructed by the system 10. While the time-integrated image merely presents an overall trace, the time-lapse frames show the evolution of the spatial position and the shape of the moving ball, including the deformation of the ball from round to elliptical shape at turning points of its trajectory, at each time point.

Figure 4E:
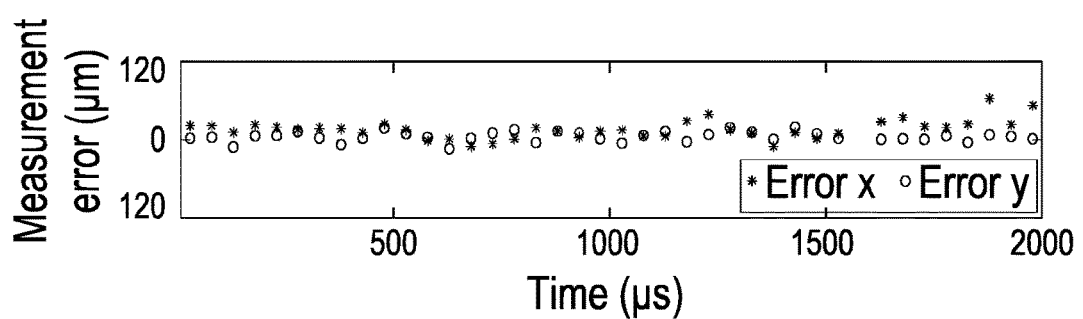
FIG. 4E shows measurement errors in the centroid positions of FIG. 4D.

To evaluate the accuracy of the reconstruction, the centroids of the bouncing ball were traced in each reconstructed frame (FIG. 4E). The measurement errors were calculated by subtracting the measured position of centroids from the pre-set ones. Further, the root-mean-square errors (RMSEs) of reconstructed centroids along the x and y axes were calculated to be 22 μm and 9 μm, respectively. The anisotropy of the root-mean-square errors was attributed to the spatiotemporal mixing along the shearing direction.

Figure 5A:
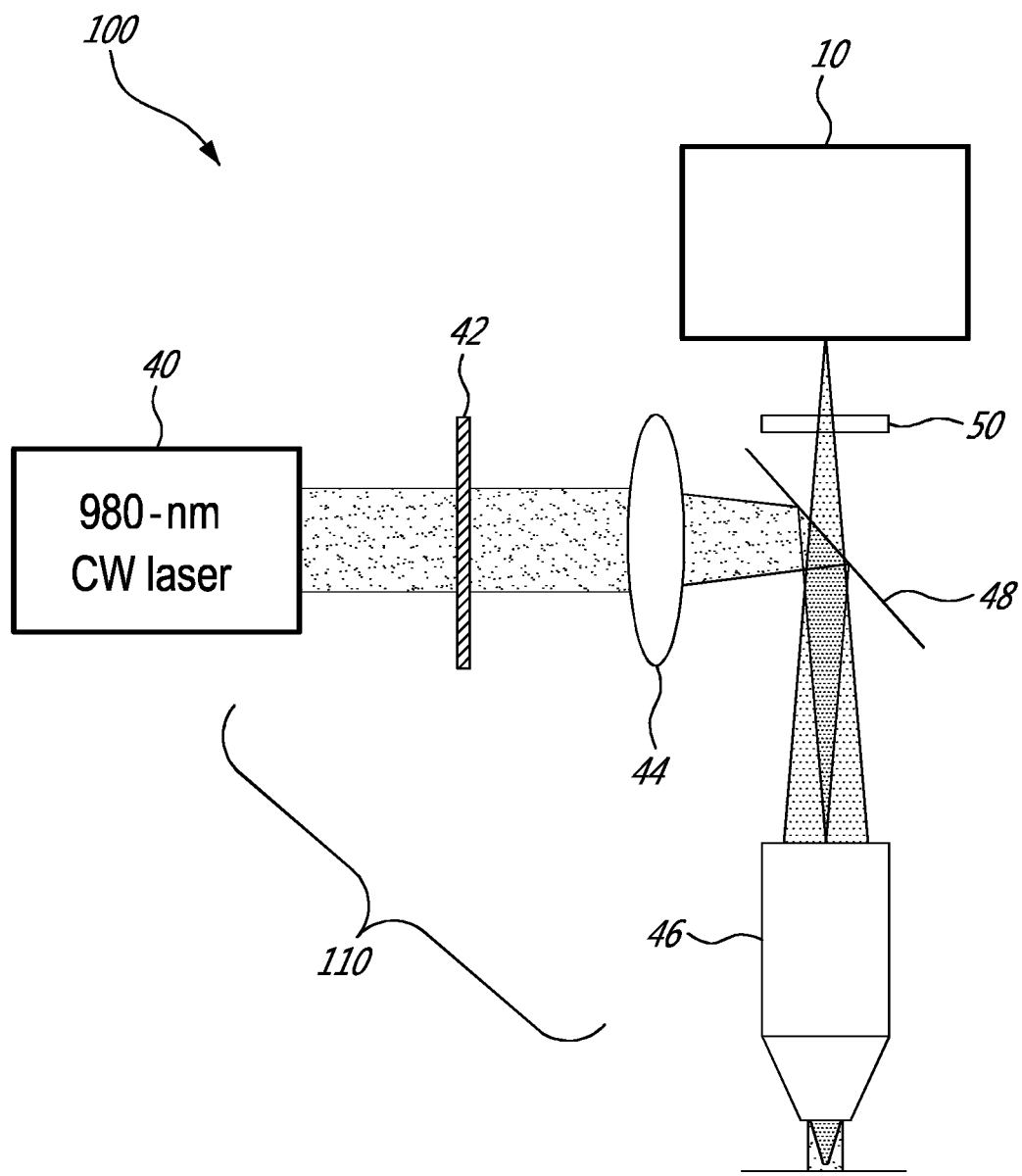
FIG. 5A is a schematical view of a phosphorescence lifetime imaging microscopy (PLIM) system according to an embodiment of an aspect of the present disclosure.

The method and system were applied to wide-field phosphorescence lifetime imaging microscopy (PLIM). As illustrated in FIG. 5A, a PLIM system 100 according to an embodiment of an aspect of the present disclosure comprises an excitation illumination unit 110 and a system 10 described hereinabove in relation to FIG. 1A as an imaging unit.

The excitation illumination unit 110 comprises a 980-nm continuous wavelength laser 40, an optical chopper 42, a tube lens 44, an objective lens 46, a dichroic mirror 48, and an optical band-pass filter 50.

The imaging speed of the imaging system 10 was 1 Mfps. Four up-conversion nanoparticles (UCNPs) with different core-shell structures were selected. All samples have a same core structure comprising NaGdF4: Er3+, Yb3+, Sample one having no shell, whereas Sample two to Sample four each have a shell of additional NaGdF4 around their core, with a shell of increasing thickness from Sample 2 to Sample 4. After pumped by 50-μs 980 nm laser pulse from the laser 40, green (center wavelength at 545 nm), red (center wavelength at 660 nm) phosphorescence light emissions, and residual pump 980 nm light were detected by spectroscopy. To explore the green phosphorescence lifetime, the red emission light and the residual pump light were filtered out using filter 50 with center wavelength of 545 nm and spectral bandwidth of ±10 nm.

Figure 5C:
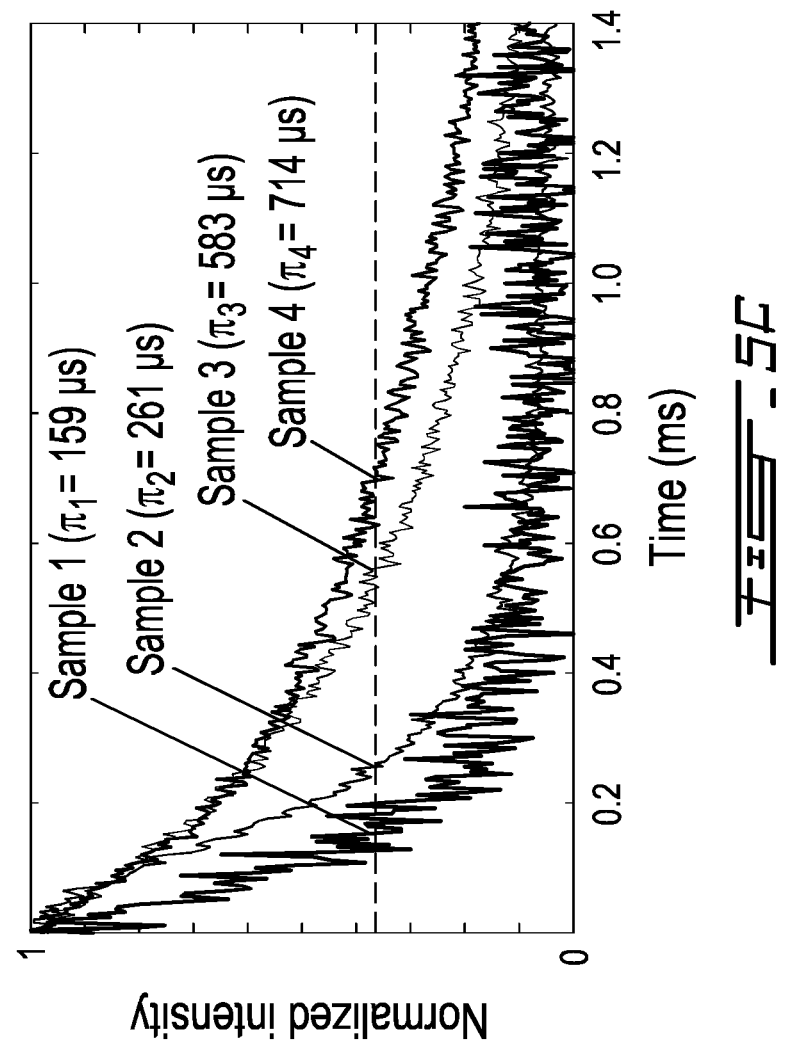
FIG. 5C shows a comparison of the phosphorescence emission decay curves of four different nanoparticle samples.
Figure 5B:
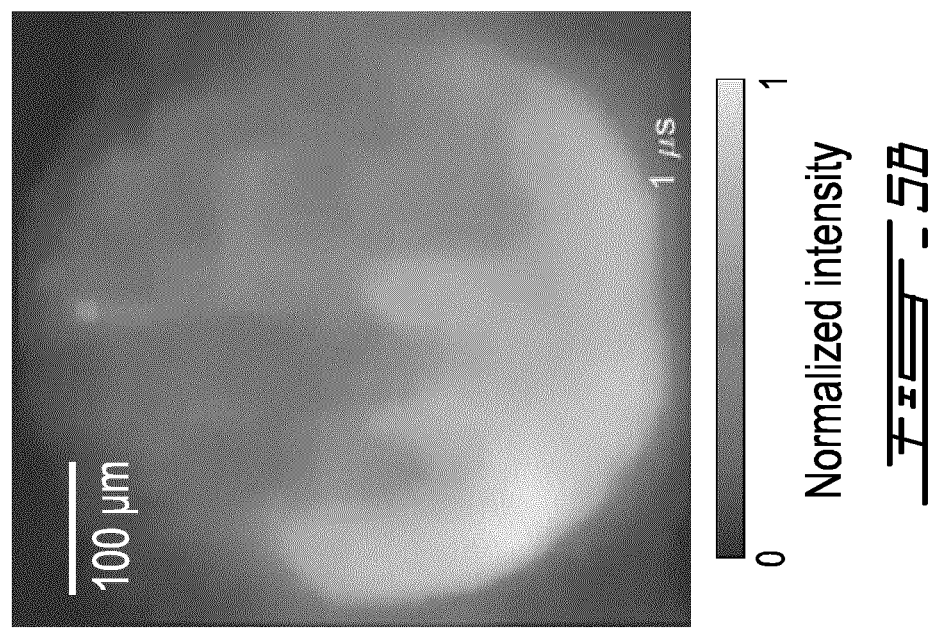
FIG. 5B shows a representative frame of a movie that presents 2-dimensional phosphorescence lifetime decay at 1 microsecond.

FIG. 5B shows a representative frame (at t=1 μs) of the movie that records 2-dimensional phosphorescence lifetime decay processing. FIG. 5C shows the exponential decay curves of the four samples, using point detection model where the imaging field of view of the PLIM system was reduced to a small area, with a diameter of about 100 micrometers. It can be seen that Sample one without a shell structure has the shortest lifetime (159 μm), whereas, Samples two to four have an increased lifetime (from 261 μs to 714 μs), as expected from the structure of the four UCNPs.

There is thus provided an imaging system comprising a DMD for spatially encoding each temporal frame of a scene by compressed sensing, a galvanometer scanner for temporal shearing, thereby creating an optical streak image, and a camera for capturing this linear image in a single shot. The mixture of 2D space and time data in the streak image is then processed to separate the data using reconstruction on the basis of the unique labels attached to each temporal frame by the DMD.

Based on optical streaking using a galvanometer scanner in a 4f imaging configuration, the present imaging system, using off-the-shelf camera, provides tunable imaging speeds of up to 1.5 Mfps, which is approximately three orders of magnitude higher than the state-of-art in imaging speed of compressed sensing-based temporal imaging using silicon sensors, a Megapixel-level spatial resolution, with a pixel count of 0.5 megapixels in each frame, and 500-frame sequence depth (i.e. the number of frames in the movie), and capable of single-shot 2-dimensional phosphorescence lifetime imaging.

The ultra-high-speed imaging capability of the system was demonstrated by capturing the transmission of single laser pulses through a mask and by tracing the shape and position of a fast-moving object in real time. There is thus provided a single-shot cost-efficiency ultra-high-speed universal imaging method and system.

The system may be integrated into a range of imaging instruments from microscopes to telescopes, to achieve a scalable spatial resolution by coupling with different front optics in these imaging instruments. Moreover, the system can be used with different cameras, such as CCD or CMOS cameras according to specific applications, allowing applying the method to a wide range of wavelengths and for acquiring various optical characteristics such as polarization. For instance, an electron-multiplying CCD camera may be combined with the system to enable high-sensitivity optical neuroimaging of action potential propagating at tens of meters per second under microscopic settings; by leveraging the imaging speed and spatial resolution of the system 10, the method was applied to action potential propagating at tens of meters per second.

As another example, an infrared-camera-based may be integrated to enable wide-field temperature sensing in deep tissue using nanoparticles. In summary, by leveraging the advantages of off-the-shelf components including camera, galvo, DMD, and achromatic lenses, the present invention provides a system and a method for widespread applications in both fundamental and applied sciences Featuring optical streaking using a galvanometer scanner in the 4f imaging system, the all-optical system uses an off-the-shelf CMOS camera with tunable imaging speeds of up to 1.5 Mfps, which is approximately three orders of magnitude higher than the state-of-art in imaging speed of compressed sensing-based temporal imaging using silicon sensors such as P2C2 and CACTI. In addition, the system can reach a sequence depth of up to 500 frames and a pixel count of 0.5 megapixels in each frame.

There is thus provided a single-shot compressed optical-streaking ultra-high-speed photography system and method, as a passive-detection computational imaging modality with a 2D imaging speed of up to 1.5 million frames per second (Mfps), a sequence depth of 500 frame, and an (x,y) pixel count of 1000×500 per frame, using standard imaging sensors typically limited to 100 frames per second.

The scope of the claims should not be limited by the embodiments set forth in the examples, but should be given the broadest interpretation consistent with the description as a whole.

The invention claimed is:

1. A system for single-shot compressed optical-streaking ultra-high-speed imaging, comprising:
   a spatial encoding module;
   a galvanometer scanner; and
   a CMOS camera;
   wherein said spatial encoding module is configured for spatially encoding the transient event with a binary pseudo-random pattern, yielding spatially encoded frames, said galvanometer scanner temporally shearing the spatially encoded frames of the transient event, and said CMOS camera receiving the temporally sheared spatially encoded frames, in one exposure of the camera, for reconstructing the transient event.

2. The system of claim 1, comprising a function generator, said function generator synchronizing rotation of the galvanometer scanner and the exposure of the camera.

3. The system of claim 1, comprising an optical relay module relaying the image from the transient event to the CMOS camera.

4. The system of claim 1, wherein said spatial encoding module has a fixed ±12° flipping angle and about 1 Mega pixel count.

5. The system of claim 1, wherein said spatial encoding module is a spatial light modulator.

6. The system of claim 1, wherein said spatial encoding module is one of: i) a digital micromirror device ad ii) a printed physical mask with an encoding pattern.

7. The system of claim 1, wherein said galvanometer scanner is placed at the Fourier plane of a 4f system of an optical relay module between the transient event and the CMOS camera.

8. The system of claim 1, wherein said galvanometer scanner temporally shears the spatially encoded frames linearly to different spatial locations along an axis of the camera according to their time of arrival.

9. The system of claim 1, wherein said galvanometer scanner is selected with a rotation frequency per second in a range between 1 and 160, and an angle step response of about 200 µs.

10. The system of claim 1, wherein said galvanometer scanner is selected with a rotation frequency per second in a range between 15 and 25 and an angle step response of about 200 µs.

11. The system of claim 1, wherein said CMOS camera has a frame rate, synchronizing with the galvanometer scanner, in a range between 1 and 160 per second, and a Mega pixel count.

12. The system of claim 1, wherein said CMOS camera, synchronizing with the galvanometer scanner, has a frame rate per second in a range between 15 and 25, and a Mega pixel count.

13. A method for single-shot compressed optical-streaking ultra-high-speed imaging, comprising spatial encoding a transient event; optical temporal shearing resulting spatially encoded frames of the event, thereby creating an optical streak image, spatio-temporal integration, and reconstruction.

14. The method of claim 13, wherein said spatial encoding the transient event comprises spatially encoding the transient event by a binary pseudo-random pattern, yielding spatially amplitude encoded frames; said optical temporal shearing of the resulting spatially encoded frames of the event comprises temporally shearing the spatially encoded frames of the event by a galvanometer scanner; said spatio-temporal integrating comprising integrating resulting spatial-temporal sheared encoded frames into a 2D image; and said reconstruction comprises recovering a movie from the 2D image recorded by a CMOS camera.

15. The method of claim 13, wherein said spatial encoding the transient event comprises spatially encoding the transient event by a binary pseudo-random pattern, yielding spatially encoded frames; said optical temporal shearing of the resulting spatially amplitude encoded frames of the event comprises temporally shearing the spatially encoded frames of the event by a galvanometer scanner; said spatio-temporal integrating comprising integrating resulting spatial-temporal sheared encoded frame into a 2D image; and said reconstruction comprises recovering a movie from the 2D image recorded by a CMOS camera; the method comprising synchronizing a linear rotation of the galvanometer scanner and exposure of the camera.

16. The method of claim 13, comprising selecting a spatial encoding module having a fixed ±12° flipping angle and about 1 Mega pixel count; a galvanometer scanner having a rotation frequency per second in a range between 1 and 160, and an angle step response of about 200 µs; and a CMOS camera having a frame rate per second in a range between 1 and 160, and a Mega pixel count.

17. The method of claim 13, comprising imaging the transient event into a spatial encoding module, the spatial encoding module spatially encoding the transient event is by a binary pseudo-random pattern; and relaying resulting spatially encoded frames by a 4f system onto a CMOS camera.

18. The method of claim 13, wherein said spatial encoding the transient event comprises multiplying an amplitude binary mask for each frame of the event, yielding encoded datacubes (x, y, t); said optical temporal shearing comprises shifting different frames to different spatial positions as a function of their arrival time, yielding spatial-temporal shifting datacubes (x, y+t−1, t); said integration comprises integrating datacubes as a 2D image (x, y+t−1); and said reconstruction comprises retrieving a video from the 2D image.

19. The method of claim 13, wherein said spatial encoding of a transient event comprises multiplying an amplitude binary mask for each frame of the event, yielding encoded datacubes (x, y, t); said optical temporal shearing comprises shifting different frames to different spatial positions as a function of their arrival time, yielding spatial-temporal shifting datacubes (x, y+t−1, t); said integration comprises integrating the datacubes as a 2D image (x, y+t−1); and said reconstruction comprises retrieving a video from a measurement E of the 2D image, with:

$$E=TS_oCI(x,y,t), \qquad (1)$$

where I(x, y, t) is the light intensity of the transient event, C represents spatial encoding, $S_o$ represents linearly temporal shearing with the subscript "o" standing for "optical", and T represents spatiotemporal integration; and $$\hat{I} = \underset{I}{\mathrm{argmin}}\{\|E - TS_oCI\|_2^2 + \lambda\phi_{TV}(I)\} \qquad (2)$$

where $\|\cdot\|_2^2$ represents the $l_2$ norm, λ is a weighting coefficient, and $\Phi_{TV}$ is total variation (TV) regularizer.

20. A method for single-shot compressed optical-streaking ultra-high-speed imaging, comprising spatial encoding a transient event; temporal shearing resulting spatially encoded frames of the event, spatio-temporal integration, and reconstruction; wherein said temporal shearing of the resulting spatially encoded frames of the event comprises temporally shearing the spatially encoded frames of the event by a galvanometer scanner.

* * * * *